US012742083B2

(12) United States Patent
Furuse et al.

(10) Patent No.: US 12,742,083 B2
(45) Date of Patent: Sep. 22, 2026

(54) AQUEOUS INK, INK CARTRIDGE AND INK JET RECORDING METHOD

(71) Applicant: CANON KABUSHIKI KAISHA, Tokyo (JP)

(72) Inventors: Tsuyoshi Furuse, Kanagawa (JP); Katsuhiro Hayashi, Kanagawa (JP); Keiichi Ito, Kanagawa (JP); Takeshi Ota, Kanagawa (JP); Kuniaki Fujimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 802 days.

(21) Appl. No.: 18/075,657

(22) Filed: Dec. 6, 2022

(65) Prior Publication Data

US 2023/0183502 A1 Jun. 15, 2023

(30) Foreign Application Priority Data

Dec. 13, 2021 (JP) ................................ 2021-201440
Nov. 7, 2022 (JP) ................................ 2022-178322

(51) Int. Cl.
*C09D 11/108* (2014.01)
*C09D 11/322* (2014.01)

(52) U.S. Cl.
CPC .......... *C09D 11/108* (2013.01); *C09D 11/322* (2013.01)

(58) Field of Classification Search
CPC ... C09D 11/108; C09D 11/322; C09D 11/102; C09D 11/104; C09D 11/326; C09D 11/107
See application file for complete search history.

(56) References Cited

U.S. PATENT DOCUMENTS 4,619,965 A * 10/1986 Ishii .......................... C09D 7/45 526/278
7,285,159 B2 10/2007 Aikawa
7,294,184 B2 11/2007 Fujimoto
7,445,325 B2 11/2008 Aikawa
7,504,488 B2 3/2009 Toyoda
7,566,362 B2 7/2009 Mori
7,618,484 B2 11/2009 Fujimoto
7,977,409 B2 7/2011 Nishiguchi
8,425,027 B2 4/2013 Nishiwaki
8,814,341 B2 8/2014 Nagao
(Continued)

FOREIGN PATENT DOCUMENTS

JP 2002-294133 A 10/2002

OTHER PUBLICATIONS

Kamiya, H. et al., "Dispersion Behavior Control of Nanoparticles and its Applications," The Micromeritis (2012), vol. 55, pp. 12-18.

*Primary Examiner* — Doris L Lee
(74) *Attorney, Agent, or Firm* — Venable LLP

(57) ABSTRACT

Provided is an aqueous ink for ink jet containing a pigment and a resin particle that disperses the pigment. The cumulative 50% particle size of the resin particle in a volume-based particle size distribution is 10 nm or less. The resin particle has a crosslinking structure. The ratio of the cumulative 50% particle size of the pigment in a volume-based particle size distribution to the cumulative 50% particle size of the resin particle in a volume-based particle size distribution is 3.0 times or more to 8.0 times or less. Also, provided are an ink cartridge and an ink jet recording method using this aqueous ink.

9 Claims, 2 Drawing Sheets

(56) References Cited

U.S. PATENT DOCUMENTS

| | | | | |
|---|---|---|---|---|
| 8,889,763 | B2 | 11/2014 | Hayashi | |
| 9,260,611 | B2 | 2/2016 | Hayashi | |
| 9,365,733 | B2 | 6/2016 | Hayashi | |
| 10,093,119 | B2 | 10/2018 | Nagase | |
| 10,131,806 | B2 | 11/2018 | Hayashi | |
| 10,150,318 | B2 | 12/2018 | Ota | |
| 10,166,803 | B2 | 1/2019 | Herlambang | |
| 10,259,960 | B2 | 4/2019 | Fujimoto | |
| 10,280,323 | B2 | 5/2019 | Fujimoto | |
| 11,072,720 | B2 | 7/2021 | Furuse | |
| 2004/0244622 | A1 * | 12/2004 | Ichinose | C09D 11/322 101/491 |
| 2010/0020142 | A1 * | 1/2010 | Bannai | B41J 2/17506 106/31.65 |
| 2011/0057982 | A1 * | 3/2011 | Saito | C09D 11/102 524/556 |
| 2011/0057987 | A1 * | 3/2011 | Inushima | C09D 11/326 347/21 |
| 2017/0355201 | A1 * | 12/2017 | Hojo | B41J 11/0015 |
| 2021/0139723 | A1 | 5/2021 | Fujimoto | |
| 2021/0139724 | A1 | 5/2021 | Murai | |
| 2021/0292577 | A1 | 9/2021 | Hayashi | |

* cited by examiner

AQUEOUS INK, INK CARTRIDGE AND INK JET RECORDING METHOD

BACKGROUND OF THE INVENTION

Field of the Invention

The present invention relates to an aqueous ink, an ink cartridge and an ink jet recording method.

Description of the Related Art

In recent years, ink jet recording apparatuses have made it possible to record images with high definition and high glossiness like those achieved in silver halide photography and offset printing, relatively easily and inexpensively even at home.

One type of ink with which images with excellent glossiness can be recorded is dye ink, which contains a dye as a coloring material. Dye inks can be used to record high-quality images with reduced granularity. However, a problem with images recorded with dye inks is that their fastness including light resistance, water resistance and gas resistance is poor. For this reason, pigment inks containing a pigment as a coloring material have started to be used in recent years.

Using a pigment ink improves the fastness of the recorded image but involves a trade-off in which the granularity and glossiness of the image are not as good as those of an image recorded with a dye ink. To improve the glossiness of an image recorded with a pigment ink, it is important to suppress light scattering on the surface of the pigment particle, and it is necessary to use a finer pigment.

A dispersant such as a surfactant or a water-soluble resin is usually used in order to disperse a pigment in an ink. However, inks containing a surfactant as a dispersant are prone to foaming. Moreover, the dispersed state of the pigment may tend to be unstable. Accordingly, the water resistance of the recorded image may be poor. In the case of using a water-soluble resin as a dispersant, the water-soluble resin will be required in a large amount as the pigment becomes finer, i.e., as its specific surface area becomes larger. This may lead to a problem that the viscosity of the ink tends to rise, which in turn lowers an ink jet suitability such as ejection stability.

To address these problems, for example, an aqueous pigment dispersion liquid has been proposed which is obtained by dispersing a pigment with a surfactant and then reacting a water-soluble resin or self-emulsifiable resin with a crosslinking agent (Japanese Patent Application Laid-Open No. 2002-294133).

The present inventors have examined an aqueous ink using the aqueous pigment dispersion liquid proposed in Japanese Patent Application Laid-Open No. 2002-294133, and found that its viscosity tends to rise over time and therefore its storage stability is insufficient. The present inventors also observed a phenomenon that the ejection direction of the ink is bent, which is what is called "deviation of ejection", when the ink is ejected again without performing a recovery operation after ink ejection is stopped for a certain period of time. The present inventors have also found that the image clarity of images recorded with the above aqueous ink is not always good, and there is room for improvement.

Thus, an object of the present invention is to provide an aqueous ink for ink jet with which an image with excellent image clarity can be recorded and also which suppresses deviation of ejection and has excellent storage stability. Also, another object of the present invention is to provide an ink cartridge and an ink jet recording method using this aqueous ink.

SUMMARY OF THE INVENTION

Specifically, the present invention provides an aqueous ink for ink jet containing a pigment and a resin particle that disperses the pigment, in which a cumulative 50% particle size of the resin particle in a volume-based particle size distribution is 10 nm or less, the resin particle has a crosslinking structure, and a ratio of a cumulative 50% particle size of the pigment in a volume-based particle size distribution to the cumulative 50% particle size of the resin particle in a volume-based particle size distribution is 3.0 times or more to 8.0 times or less.

Further features of the present invention will become apparent from the following description of exemplary embodiments with reference to the attached drawings.

DESCRIPTION OF THE EMBODIMENTS

Figure 1:
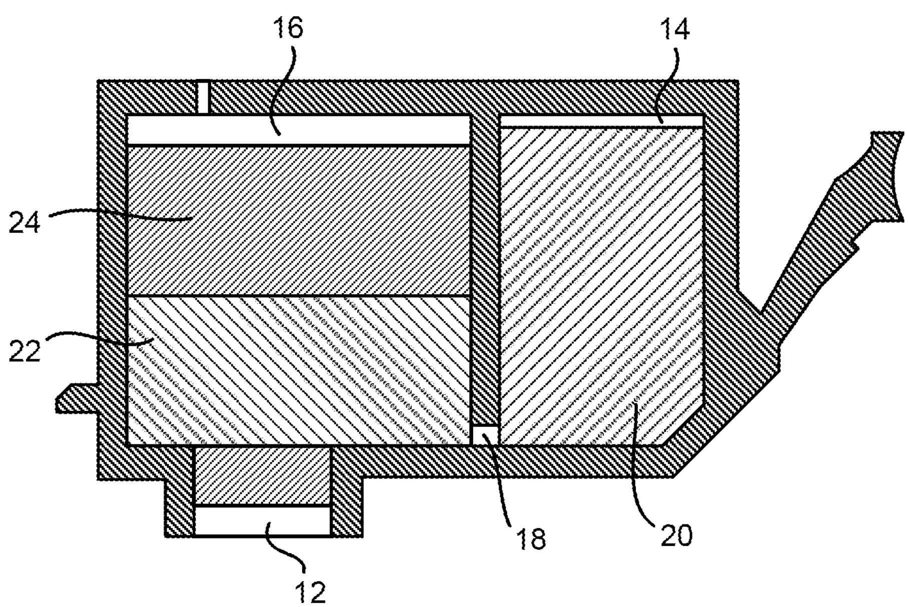
FIG. 1 is a cross-sectional view schematically illustrating one embodiment of an ink cartridge of the present invention.

The present invention will further be described below in detail through a preferred embodiment. In the present invention, when a compound is a salt, the salt is dissociated into ions in ink, and this state will be expressed as "containing a salt" for convenience. Moreover, an aqueous ink for ink jet will also be referred to simply as "ink". Physical property values are values at normal temperature (25° C.), normal pressure (1 atmosphere=101,325 Pa) and normal humidity (relative humidity 50%) unless otherwise noted. Also, "unit" means a unit structure corresponding to a single monomer unless otherwise noted. The terms "(meth)acrylic acid" and "(meth)acrylate" represent "acrylic acid, methacrylic acid" and "acrylate, methacrylate", respectively.

In an attempt to maintain the dispersed state of a pigment in an aqueous ink stable, the present inventors have examined resin particles to be used to disperse a pigment. Making the pigment finer increases the specific surface area in inverse proportion to the particle size, and decreases the surface-surface distance between particles of the pigment. An average distance "h" between particles of a pigment is represented by Equation (1) below.

$$h = D\left(\left((\rho(1-c)+c)/3\pi c + 5/6\right)^{0.5} - 1\right) \quad (1)$$

where "c" is the mass fraction of the pigment in an ink, "ρ" is the density of the pigment, and "D" is the particle size of the pigment (Kamiya, H. et al., The micromeritics (2012), vol. 55, pp. 12-18).

By plugging the density of a commonly used organic pigment and the content (mass fraction) of the pigment in an ink into Equation (1) above, it can be understood that the average distance between particles of the pigment tends to be the particle size of the pigment or less. In order for a pigment to be stably dispersed, electrostatic repulsion by electric charges and steric repulsion by a dispersant are utilized. Here, a water-soluble organic solvent is usually added to inks for improvement of ejection characteristics and the like. This makes the relative permittivity of the inks greatly lower than that of water and limits the contribution of the steric repulsion. Thus, in order for a pigment to be stably dispersed in an ink, it is necessary to effectively utilize the steric repulsion by a dispersant.

The present inventors have considered using a resin particle as a dispersant for dispersing a pigment. This has led to a finding that satisfying the following conditions (i) and (ii) can maintain the dispersed state of a pigment stable, thereby improving the storage stability of the ink, without lowering the image clarity.

(i) The cumulative 50% particle size of the resin particle in a volume-based particle size distribution is 10 nm or less.

(ii) The ratio of the cumulative 50% particle size of the pigment in a volume-based particle size distribution to the cumulative 50% particle size of the resin particle in a volume-based particle size distribution is 3.0 times or more to 8.0 times or less.

If a cumulative 50% particle size $D_{50}$ of the resin particle in a volume-based particle size distribution is more than 10 nm, it is difficult for the resin particle to be adsorbed to the pigment. This makes it difficult to maintain the dispersed state of the pigment stable, and thus lowers the storage stability of the ink. If the ratio of a cumulative 50% particle size $D_{50}$ of the pigment in a volume-based particle size distribution to the cumulative 50% particle size of the resin particle in a volume-based particle size distribution is less than 3.0 times, the number of the resin particles contributing to the dispersing of the pigment is 10 or less when the average coverage is 30%. In this case, a sufficient steric repulsion effect cannot be achieved, which makes it difficult to maintain the dispersed state of the pigment stable and lowers the storage stability of the ink. On the other hand, if the above ratio is more than 8.0 times, the particle size of the pigment is large, which lowers the image clarity of the recorded image. The average coverage refers to a value derived by dividing the sum of cross-sectional areas of resin particles adsorbed to the surface of a pigment particle by the total surface area of the pigment particle.

By conducting further studies, the present inventors have found that using a resin particle having a crosslinking structure can lower the viscosity of an ink and thus suppress deviation of ejection of the ink. Having a crosslinking structure presumably suppresses entanglement of dissolved resin chains of resin particles, thereby making it difficult for the viscosity of the ink to increase, which in turn maintains the ejection accuracy of the ink and thus suppresses deviation of ejection.

<Ink>

An ink of the present invention is an aqueous ink for ink jet containing a pigment and a resin particle that disperses the pigment. Hereinbelow, constituent components of the ink of the present invention and physical properties of the ink will be described in detail.

<<Pigment>>

As a coloring material, a pigment capable of being dispersed in the form of particles in the ink is used. The content (% by mass) of the pigment in the ink is preferably 0.10% by mass or more to 15.00% or less and more preferably 1.00% by mass or more to 10.00% or less relative to the total mass of the ink.

Specific examples of the pigment include: inorganic pigments such as carbon black and titanium oxide; and organic pigments such as an azo pigment, phthalocyanine pigment, perylene pigment, perinone pigment, quinacridone pigment, dioxazine pigment, diketopyrrolopyrrole pigment, quinophthalone pigment, isoindolinone pigment and imidazolone pigment.

The pigment is preferably at least one of an organic pigment or carbon black. Moreover, the organic pigment is preferably at least one selected from the group consisting of an azo pigment, phthalocyanine pigment, perylene pigment, perinone pigment, quinacridone pigment, dioxazine pigment, diketopyrrolopyrrole pigment and quinophthalone pigment.

Whether the pigment is dispersed by the resin particle can be determined by following the method described below. While the following will describe a method in which the resin particle is extracted from the ink and analyzed, a pigment and a resin particle extracted from a pigment dispersion liquid can also be analyzed similarly. First, in order to separate the pigment and dispersant (such as the resin particle) in the ink from other components therein not contributing to the dispersing (water-soluble components), ultrafiltration is performed until a sufficient amount is passed through the filter. As a result, a component containing the pigment is separated and obtained in the form of a liquid. The obtained liquid is subjected to an ultracentrifugation process to separate the resin particle from the pigment, which is with the dispersant (such as the resin particle), by a density gradient centrifugation method. In the case of using a density gradient sedimentation velocity method, the resin particle can be separated and extracted by the difference in sedimentation coefficient between components. In the case of using a density gradient sedimentation equilibrium method, the resin particle can be separated and extracted by the difference in density between the components. If the resin particle can be separated by such a method, one can determine that the resin particle was a dispersant for dispersing the pigment.

<<<Physical Properties of Pigment Particle>>>

<<<<Mass Ratio of Pigment and Resin Particle>>>>

The mass ratio of the content (% by mass) of the resin particle in the ink to the content (% by mass) of the pigment is preferably 0.06 times or more to 1.00 times or less. If the above mass ratio is less than 0.06 times, the content of the resin particle is so small for the pigment as to lower the effect of improving the storage stability. On the other hand, if the above mass ratio is more than 1.00 times, the content of the resin particle is so large for the pigment that the viscosity of the ink may easily rise. This may lower the effect of suppressing deviation of ejection of the ink. The above mass ratio is more preferably 0.06 times or more to 0.50 times or less and particularly preferably 0.10 times or more to 0.20 times or less.

<<<<Cumulative 50% Particle Size of Pigment in Volume-Based Particle Size Distribution>>>>

The cumulative 50% particle size of the pigment in a volume-based particle size distribution is preferably 1 nm or more to 80 nm or less and more preferably 10 nm or more to 70 nm or less. The cumulative 50% particle size in a volume-based particle size distribution refers to the diameter of the particle in a particle size cumulative curve at 50% cumulatively reached from the smallest particle size based on the total volume of the particles measured. Cumulative 50% in a volume-based particle size distribution can be measured by dynamic light scattering, and its conditions are similar to the later-described method of determining whether a resin is a resin particle.

<<Resin Particle>>

The content (% by mass) of the resin particle in the ink is preferably 0.01% by mass or more to 10.00% or less and more preferably 0.02% by mass or more to 5.00% or less relative to the total mass of the ink. The resin particle is present in a state of being dispersed in the ink, i.e., in the state of a resin emulsion. The resin particle does not need to encapsulate the coloring material.

In the present invention, "resin particle" means a resin present in a state of not being dissolved in an aqueous medium forming the ink. More specifically, "resin particle" means a resin that can be present in the aqueous medium in a state of being formed as a particle whose particle size can be measured by dynamic light scattering. On the other hand, "water-soluble resin" means a resin present in a state of being dissolved in the aqueous medium forming the ink. More specifically, "water-soluble resin" means a resin that can be present in the aqueous medium in a state of not being formed as a particle whose particle size can be measured by dynamic light scattering. As the opposite of "water-soluble resin", the resin particle may be expressed as "water-dispersible resin (water-insoluble resin)".

Whether a resin is "resin particle" can be determined by following the method described below. First, a liquid containing the determination target resin (the content of the resin: 10% by mass) is prepared. Then, a sample is prepared by diluting this liquid with pure water such that the content of the resin is reduced to approximately 1.0%. If a particle having a particle size is observed in measurement of the particle size of the resin in the sample by dynamic light scattering, the resin can be determined as "resin particle" (i.e., determined as "water-dispersible resin"). On the other hand, if a particle having a particle size is not observed, the resin is determined as not "resin particle" (i.e., determined as "water-soluble resin"). The conditions for this measurement can be as follows, for example:

SetZero: 30 seconds
Number of times measurement is performed: 10
Measurement duration: 120 seconds
Shape: perfect sphere
Refractive index: 1.5
Density: 1.0.

As a particle size distribution measurement apparatus, a particle size analyzer using dynamic light scattering (e.g., trade name "Nanotrac Wave II-Q", manufactured by MicrotracBEL Corp.) or the like can be used. Needless to say, the particle size distribution measurement apparatus to be used, the measurement conditions and the like are not limited to the above.

For resins such as resin dispersants that can be used other than the resin particle, whether they are resin particles is defined in a manner similar to the above. Whether these other resins are resin particles or water-soluble resins can be determined by a method similar to the above. Here, for each of the other resins, to make the determination simple, a liquid containing the resin neutralized with an amount of an alkali (such as sodium hydroxide or potassium hydroxide) corresponding to its acid value (the content of the resin: 10% by mass) may be used to make the determination.

The cumulative 50% particle size of the resin particle in a volume-based particle size distribution needs to be 10 nm or less, and is preferably 1 nm or more and more preferably 4 nm or more. The cumulative 50% particle size of the resin particle in a volume-based particle size distribution can be measured under conditions similar to those in the above-described method of determining whether a resin is a resin particle. The ratio of the cumulative 50% particle size of the pigment in a volume-based particle size distribution to the cumulative 50% particle size of the resin particle in a volume-based particle size distribution needs to be 3.0 times or more to 8.0 times or less and is preferably 4.0 times or more to 7.0 times or less.

Examples of the resin forming the resin particle include an acrylic-based resin, polyester-based resin, urethane-based resin, polystyrene-based resin and so on. Of these, the acrylic-based resin, polyester-based resin and urethane-based resin are preferable. These resins are easily adsorbed to the pigment stably and can therefore improve the storage stability of the ink. In particular, if the above resins have a carboxylic acid group, they tend to improve the storage stability of the ink to a greater extent. This is because ionic repulsion occurs due to the carboxylic acid group that is ionically dissociated and in addition hydrogen bonding occurring between a plurality of resin particles keeps the shapes of the resin particles stable, which makes it easier for the resin particles to be adsorbed stably to the surfaces of pigment particles. Also, the resin particle formed of the acrylic resin is particularly preferable since it does not easily get attached to ink channels in a recording head and thus tend to effectively suppress deviation of ejection. The resin particle may be formed of one kind of resin or of two or more kinds of resins. A resin particle formed of one kind of resin is preferable.

<<<Constituent Material of Resin Particle: Acrylic-Based Resin>>>

The acrylic-based resin forming the resin particle may be any one of a random copolymer, a block copolymer or a graft copolymer. The acrylic-based resin is preferably an acrylic-based resin having a hydrophilic unit and a hydrophobic unit as its constituent units. Of such acrylic-based resins, one having a hydrophilic unit derived from a (meth) acrylic acid and a hydrophobic unit derived from a monomer having an aliphatic group or an aromatic group is preferable.

The hydrophilic unit is a unit having a hydrophilic group such as an anionic group, a hydroxy group or an ethylene oxide group. The hydrophilic unit can be formed by, for example, polymerizing a monomer having the hydrophilic group. Specific examples of the monomer having the hydrophilic group include: acidic monomers having a carboxylic acid group, such as a (meth)acrylic acid; anionic monomers such as anhydrides and salts of these acidic monomers; monomers having a hydroxy group, such as 2-hydroxyethyl (meth)acrylate; monomers having an ethylene oxide group, such as methoxypolyethylene glycol (meth)acrylate; and so on. Examples of the cations forming the salts of the acidic monomers include ions of lithium, sodium, potassium, ammonium, organic ammonium and so on.

The hydrophobic unit is a unit not having a hydrophilic group such as an anionic group, a hydroxy group or an ethylene oxide group. The hydrophobic unit can be formed by, for example, polymerizing a hydrophobic monomer not having the hydrophilic group. Specific examples of the hydrophobic monomer include: monomers having an aromatic group, such as styrene, α-methylstyrene and benzyl (meth)acrylate; monomers having an aliphatic group, such as ethyl (meth)acrylate, methyl (meth)acrylate, (iso-)propyl (meth)acrylate, butyl (meth)acrylate and 2-ethylhexyl (meth)acrylate; and so on.

<<<Constituent Material of Resin Particle: Polyester-Based Resin>>>

The polyester-based resin forming the resin particle preferably has a carboxylic acid group. Usually, an unreacted hydroxy group or carboxylic acid group is present at a terminal of the polyester-based resin. When no carboxylic acid group is present at a terminal of the polyester resin, a carboxylic acid group is present at a part other than the terminal. The polyester-based resin is usually formed of a unit derived from a polyhydric alcohol and a unit derived from a polycarboxylic acid. A structure containing an ester bond (—COO—) and formed of the unit derived from a polyhydric alcohol and the unit derived from a polycarboxylic acid will also be denoted as "ester unit".

<<<<Polyhydric Alcohol>>>>

Examples of a polyhydric alcohol that becomes, by reaction, the unit forming the polyester-based resin and derived from a polyhydric alcohol include polyhydric alcohols with a valence of two to four. Examples of the polyhydric alcohols include polyhydric alcohols having an aliphatic group, polyhydric alcohols having an aromatic group, sugar alcohols and so on. It is preferable to user a polyhydric alcohol having a valence of two or three since it is easy adjust the weight average molecular weight of the polyester-based resin with that polyhydric alcohol. Of such polyhydric alcohols, it is preferable to use one having a linear aliphatic group since it improves the crystallinity of the polyester-based resin and makes it possible to record images with excellent chemical resistance.

<<<<Polycarboxylic Acid>>>>

Examples of a polycarboxylic acid that becomes, by reaction, the unit forming the polyester-based resin and derived from a polycarboxylic acid include polycarboxylic acids with a valence of two to four. Examples of the structures of the polycarboxylic acids include polycarboxylic acids having an aliphatic group, polycarboxylic acids having an aromatic group, nitrogen-containing polycarboxylic acids and so on. It is preferable to user a polycarboxylic acid having a valence of two or three since it is easy adjust the weight average molecular weight and acid value of the polyester-based resin with that polycarboxylic acid. Of such polycarboxylic acids, it is preferable to use one having a linear aliphatic group since it improves the crystallinity of the polyester-based resin and makes it possible to record images with excellent chemical resistance.

<<<Constituent Material of Resin Particle: Urethane-Based Resin>>>

The urethane-based resin forming the resin particle preferably has a carboxylic acid group. The urethane-based resin has a unit derived from a polyisocyanate, a unit derived from a polyol having no acid group and a unit derived from a polyol having an acid group.

<<<<Polyisocyanate>>>>

The polyisocyanate is a compound having two or more isocyanate groups within a molecule. Examples of the polyisocyanate include aliphatic polyisocyanates, alicyclic polyisocyanates, aromatic polyisocyanates and aliphatic polyisocyanates.

<<<<Polyols>>>>

Examples of the polyols include: polyols having no acid group, such as a polyester polyol, polycarbonate polyol and polyether polyol; polyols having an acid group; and so on. As the polycarbonate polyol, it is possible to use one having 1,6-hexanediol as the basic skeleton, as well as a polycarbonate diol manufactured by a publicly known method. Examples of the polyether polyol include addition polymers of alkylene oxides and polyhydric alcohols, (poly)alkylene glycols and so on. Examples of a polyamine include polyamines such as ethylenediamine, diethylenetriamine, hydrazine and polyethylene polyimine. The polyols having an acid group are preferably ones having a carboxylic acid group as the acid group. Examples of the polyols having a carboxylic acid group include dimethylol acetic acid, dimethylol propionic acid, dimethylol butanoic acid and so on.

<<<<Neutralizer and Chain Extender>>>>

Examples of a neutralizer used in the manufacture of the urethane-based resin include: organic bases such as triethanolamine, trimethylamine and triethylamine; inorganic bases such as potassium hydroxide, sodium hydroxide, lithium hydroxide and ammonia; and so on. Of these, a monovalent inorganic base is preferably used. It is preferable to use at least one of potassium hydroxide, sodium hydroxide or lithium hydroxide. Examples of a chain extender usable in the manufacture of the urethane-based resin include compounds having two or more hydroxy groups or amino groups within a molecule.

<<<Crosslinking Agent>>>

The resin particle has a crosslinking structure. The resin particle, which has a crosslinking structure, can be manufactured using a crosslinking agent. As the crosslinking agent, it is preferable to use a compound having two or more polymerizable functional groups within a molecule. Specifically, it is possible to use a compound having two or more ethylenically unsaturated bonds, a compound having two or more glycidyl groups and so on. Also, as a crosslinking agent that reacts with a carboxylic acid group, it is possible to use carbodiimide, aziridine, oxazoline, hydrazide and so on.

Examples of a crosslinking agent that becomes a unit derived from the crosslinking agent by polymerization include compounds having two or more ethylenically unsaturated bonds. Examples of such crosslinking agents include: diene compounds such as butadiene and isoprene; bifunctional (meth)acrylates such as 1,4-butanediol di(meth) acrylate, 1,9-nonanediol di(meth)acrylate, (mono-, di-, tri-, poly-)ethylene glycol di(meth)acrylate, (mono-, di-, tri-, poly-)propylene glycol di(meth)acrylate, (mono-, di-, tri-, poly-)tetramethylene glycol di(meth)acrylate, ethylene oxide-modified bisphenol A di(meth)acrylate, 2-hydroxy-3-(meth)acryloyloxypropyl methacrylate, propoxylated ethoxylated bisphenol A di(meth)acrylate, ethoxylated bisphenol A di(meth)acrylate, 9,9-bis(4-(2-(meth)acryloyloxyethoxy)phenyl)fluorene, tricyclodecane dimethanol di(meth)acrylate, 1,10-decanediol di(meth)acrylate, 1,6-hexanediol di(meth)acrylate, neopentyl glycol di(meth) acrylate, tricyclodecane dimethanol di(meth)acrylate, ethoxylated polypropylene glycol di(meth)acrylate and glycerin di(meth)acrylate; trifunctional (meth)acrylates such as tris(2-(meth)acryloyloxyethysocyanurate, trimethylolpropane tri(meth)acrylate, tris(2-hydroxyethyl)isocyanurate tri (meth)acrylate, ethoxylated trimethylolpropane tri(meth) acrylate, pentaerythritol tri(meth)acrylate, propoxylated trimethylolpropane tri(meth)acrylate, propoxylated glyceryl tri(meth)acrylate, ethoxylated isocyanurate tri(meth)acrylate, ε-caprolactone-modified tris-(2-(meth)acryloyloxyethyl)isocyanurate and ethylene oxide-modified trimethylolpropane tri(meth)acrylate; tetrafunctional (meth)acrylates such as ditrimethylolpropane tetra(meth)acrylate, ethoxylated pentaerythritol tetra(meth)acrylate and pentaerythritol tetra(meth)acrylate; divinylbenzene; and so on. Of the compounds having two ethylenically unsaturated bonds within a molecule, divinylbenzene and (mono-, di-, tri-, poly-)ethylene glycol di(meth)acrylate are more preferable. Compounds having two or more ethylenically unsaturated bonds as crosslinking agents are particularly preferable as crosslinking agents for the acrylic-based resin.

Examples of the compounds having two or more glycidyl groups include ethylene glycol diglycidyl ether, polyethylene glycol diglycidyl ether, sorbitol polyethylene glycol diglycidyl ether, glycerol polyglycidyl ether, diglycerol polyglycidyl ether, polyglycerol polyglycidyl ether, pentaerythritol polyglycidyl ether, propylene glycol diglycidyl ether, polypropylene glycol diglycidyl ether, trimethylolpropane polyglycidyl ether, neopentyl glycol diglycidyl ether and so on. Of these, ethylene glycol diglycidyl ether is preferable for its ability to form a high-density crosslinking structure. The compounds having two or more glycidyl groups as crosslinking agents are usable regardless of the resin type.

The crosslinking agent that becomes a unit derived from the crosslinking agent by polymerization is preferably one with a molecular weight of 200 or more, more preferably one with a molecular weight of 300 or more, and particularly preferably one with a molecular weight of 400 or more. Also, as the crosslinking agent, a compound having two ethylenically unsaturated bonds is preferable. Using a compound having two ethylenically unsaturated bonds as the crosslinking agent effectively suppresses aggregation of the resin particle which would otherwise occur due to excessive cross-linkage. Accordingly, a resin particle with more uniform particle sizes can be obtained.

A resin particle formed of a resin having a crosslinking structure containing an alkylene oxide group is preferable. Examples of the alkylene oxide group include an ethylene oxide group, a propylene oxide group and so on, and the ethylene oxide group is preferable. The particle size of a resin particle formed of a resin containing the alkylene oxide group in its crosslinking structure does not easily change even if the resin is dissolved or a liquid component penetrates into the resin particle due to a change in the environment in which the ink is situated. Accordingly, the resin particle tends to be kept adsorbed stably to the surface of the pigment particle. This improves the storage stability of the ink. Also, the repetition number of the alkylene oxide group included in a single crosslinking structure is preferably nine or less. In this way, the crosslinking structure in the resin forming the resin particle is small, and the mesh structure formed by the cross-linkage is dense. Thus, even if the resin is dissolved due to a change in the environment in which the ink is situated, the degree of the dissolution is low. This reduces attachment of the resin to ink channels in the recording head and makes it easier to effectively suppress deviation of ejection, and is therefore preferable. The repetition number of the alkylene oxide group included in a single crosslinking structure is preferably one or more.

<<<Acid Value of Resin>>>

The acid value of the resin forming the resin particle is preferably 10 mgKOH/g or more to 150 mgKOH/g or less. If the acid value of the resin is less than 10 mgKOH/g, the amount of the carboxylic acid group is so small that the resin particle tends to aggregate, which may make it difficult to control the particle size of the resin particle. If, on the other hand, the acid value of the resin is more than 150 mgKOH/g, the amount of the carboxylic acid group is so large that the hydrophilicity of the resin particle may become excessively high, which may make it difficult to control the particle size of the resin particle. The acid value of the resin is more preferably 10 mgKOH/g or more to 130 mgKOH/g or less. The acid value of the resin can be measured by an acid-base titration utilizing a potential difference.

<<<Weight Average Molecular Weight of Resin>>>

The weight average molecular weight of the resin forming the resin particle is preferably 5,000 or more to 70,000 or less. The weight average molecular weight of the resin is a value in terms of polystyrene measured by gel permeation chromatography.

<<<Method of Manufacturing Resin>>>

The acrylic-based resin can be synthesized as below. As for the polymerization method, any one of industrially used solution polymerization, bulk polymerization, suspension polymerization or emulsion polymerization may be used. With the solution polymerization, the acrylic-based resin can be synthesized as follows, for example. A polymerization solvent, such as toluene, and monomers are charged into a polymerization container equipped with a stirring device, thermometer, inert gas introduction pipe, capacitor and monomer dripping device, and heated to a predetermined polymerization temperature. After the predetermined polymerization temperature is reached, a solution of a polymerization initiator equivalent in mol to 0.02 to 1.00 time the numbers of moles of the monomers is dripped into the polymerization container for a predetermined period of time. After the dripping, the polymerization reaction is continued until a desired polymerization rate is reached. In this way, the acrylic-based resin can be manufactured. Examples of the polymerization initiator include: organic peroxides, such as benzoyl peroxide; and azo-based polymerization initiators, such as 2,2'-azobis(isobutyronitrile).

The polyester-based resin can be synthesized by reacting a polyhydric alcohol and a polycarboxylic acid with each other (esterification reaction). It is preferable to use an esterification catalyst in the esterification reaction. Either the polyhydric alcohol or the polycarboxylic acid may be added to a reaction system as needed to induce a transesterification reaction which cuts some of the ester bonds. In this way, the molecular weight of the polyester-based resin to be obtained can be adjusted. In the esterification reaction, the amounts of the raw materials to be used may be adjusted such that the number of moles of the carboxylic acid group in the polycarboxylic acid will be larger than the number of moles of the hydroxy group in the polyhydric alcohol. In this way, a polyester-based resin having the carboxylic acid group can be obtained. Also, by using the polycarboxylic acid in the transesterification reaction, a polyester-based resin having the carboxylic acid group can be obtained.

The urethane-based resin can be synthesized as follows. A polyisocyanate and polyols are charged into a reaction vessel equipped with a stirrer, thermometer, nitrogen gas introduction pipe and reflux pipe, and are heated to react under a nitrogen gas atmosphere. Then, a chain extender, a diol having an acid group, a solvent and so on are added. While the residual ratio of the isocyanate groups is checked by Fourier-transform infrared spectroscopy (FR-IR), the reaction is continued until a desired residual ratio is reached. In this way, the urethane-based resin can be manufactured.

<<<Method of Manufacturing Resin Particle>>>

The synthesized resin is preferably processed into an appropriate form via pressurization, crushing or the like, and then used in the next step of processing the resin into a particle. The resin particle formed of the resin will be used as a constituent component of an aqueous ink, and is thus preferably in the form of a dispersion liquid in which the resin particle is dispersed in an aqueous liquid medium. The aqueous liquid medium mainly contains water such as deionized water, ion-exchanged water or distilled water, and may contain a water-soluble organic solvent as necessary. The content (% by mass) of the water in the aqueous liquid medium is preferably 50% by mass or more. It is also preferable to use a liquid medium which practically does not contain a water-soluble organic solvent (i.e., water).

Examples of the method of processing the resin into a particle to form a resin particle include a dispersion method, a phase inversion (emulsification) method and so on. Examples of the dispersion method include the methods (1) and (2) below and so on.

(1) A method in which a solution obtained by dissolving the resin in an organic solvent solution is added to the aqueous liquid medium to disperse the resin.

(2) A method in which the resin is added to an organic solvent, followed by further adding the aqueous liquid medium and mixing, to disperse the resin.

Examples of the phase inversion (emulsification) method include a method in which the resin is precipitated in the form of a particle in the course of phase inversion from a solvent system to an aqueous system through addition of the aqueous liquid medium to a solution obtained by dissolving the resin in an organic solvent, and so on. In both methods, it is preferable to utilize a publicly known dispersing machine to process the resin into a particle while applying an appropriate shear force so as to adjust the particle size of the resin particle.

It is preferable to manufacture the resin particle by the phase inversion (emulsification) method since it is capable of accurately adjusting the particle size of the resin particle to be obtained. A method of manufacturing the resin particle by the phase inversion (emulsification) method will now be described.

Firstly, the resin is dissolved in an organic solvent to obtain a resin solution. Examples of the organic solvent include: ethers such as tetrahydrofuran and dibutyl ether; ketones such as acetone and methyl ethyl ketone; and alcohols such as isopropanol. It may be difficult to accurately adjust the particle size if using only an organic solvent with such low solubility to water that the organic solvent is not easily miscible with water in any ratio (such as methyl ethyl ketone). Hence, as the organic solvent, it is preferable to use any of ethers miscible with water in any ratio, such as tetrahydrofuran. The ethers such as tetrahydrofuran are preferable also because the resin is highly soluble in them.

To uniformly dissolve the resin, it is preferable to dissolve the resin in the organic solvent with heating. Note that the heating is preferably done at a temperature lower than the boiling point of the organic solvent in which to dissolve the resin. If the density of the resin in the resin solution is low, it may be difficult to control the particle size distribution. For this reason, the content (% by mass) of the resin in the resin solution is preferably 10.0% by mass or more to 60.0% or less and more preferably 20.0% by mass or more to 40.0% or less.

Thereafter, the aqueous liquid medium is gradually added to the obtained resin solution to precipitate a resin particle. A base is preferably added before or during the addition of the aqueous liquid medium since doing so can maintain the dispersed state of the resin particle stable. As the base, hydroxides of alkali metals such as sodium hydroxide and potassium hydroxide, ammonia and so on are usable. It is preferable to add such a base in the form of an aqueous solution. The amount of the base to be added can be managed with the neutralization ratio (mol %) based on the acid value of the resin. The neutralization ratio is preferably 70 mol % or more to 100 mol % or less. As the amount of the aqueous liquid medium added increases, the resin solution appearing transparent at first yields a white turbidity and becomes emulsified. As a result, a resin particle is formed. By adjusting the content of the resin in the resin solution, the neutralization ratio, the shear force to be applied during the dispersion and so on, it is possible to control the particle size of the resin particle to be obtained, its particle size distribution and so on.

The emulsified product thus obtained is depressurized to distill the organic solvent away and, if necessary, filtered through a filter (stainless mesh) with an appropriate pore size or the like to remove coarse particles. Then, the content of the resin particle is adjusted by adding water. As a result, a liquid containing the resin particle (an aqueous dispersion liquid of the resin particle) is prepared. The water used to adjust the content is preferably deionized water, ion-exchanged water or distilled water. The content (% by mass) of the resin particle in the liquid containing the resin particle is preferably 5.0% by mass or more to 30.0% or less and more preferably 15.0% by mass or more to 30.0% or less from the viewpoint of the ink's productivity.

Also, by adding the crosslinking agent to the obtained resin particle to react them with each other, a resin particle having a crosslinking structure can be obtained. The amount of the crosslinking agent is preferably such that the amount of the crosslinking group in mole is 0.1 or more to 0.5 or less times the amount of the carboxylic acid group in the resin. If the amount of the crosslinking agents is excessively small, the degree of the cross-linkage tends not to be sufficiently high. This may raise the viscosity of the ink and thus slightly lower the effect of suppressing deviation of ejection. On the other hand, if the amount of the crosslinking agent is excessively large, the residual amount of the carboxylic acid group will be small. This may make it difficult to maintain the dispersed state of the resin particle stable and thus slightly lower the storage stability. During the cross-linkage, heating is preferably performed in order to promote the reaction. It is preferable to track the residual amount of the crosslinking agent by FT-IR or the like and continue the reaction until a desired residual ratio is reached. In the above, a method in which the formation of the resin particle is followed by the cross-linkage has been described as an example. Alternatively, the crosslinking agent may be used when the resin is synthesized.

<<<Analysis of Composition of Resin Particle>>>

The kind and composition of the resin forming the resin particle can be analyzed by the following method, for example. First, in an organic solvent in which the resin particle is soluble, such as tetrahydrofuran, the resin particle is dissolved to prepare a sample. The resin particle may be in the form of an aqueous dispersion liquid and in a dried form. The prepared sample is analyzed by methods such as nuclear magnetic resonance (NMR) spectroscopy and matrix-assisted laser desorption/ionization mass spectrometry (MALDI-MS). In this way, it is possible to figure out the kinds and ratios of the constituent units (monomers) of the resin. Moreover, by analyzing the resin particle itself by pyrolysis gas chromatography, it is possible to detect the constituent units (monomers) of the resin. If an insoluble component that does not dissolve in the organic solvent is produced when the sample is prepared, it is possible to detect the constituent units (monomers) of the resin by analyzing the produced insoluble component by pyrolysis gas chromatography.

The crosslinking structure of the resin particle (the crosslinking structure of the resin forming the resin particle) can be analyzed by the following method, for example. First, the constituent units (monomers) of the resin are analyzed by following the procedure of the composition analysis described above. The portion with the crosslinking structure is an insoluble component that does not dissolve in the organic solvent. For the insoluble component, using $^{13}C$-CP/MAS solid-state NMR measurement, an NMR spectrum may be analyzed by a waveform separation method to quantify the amount of the functional groups. In this way, the crosslinking structure can be analyzed.

<<Aqueous Medium>>

The ink of the present invention is an aqueous ink containing an aqueous medium which is water or a mixed solvent of water and a water-soluble organic solvent. As the water, deionized water (ion-exchanged water) is preferably used. The content (% by mass) of the water in the ink is preferably 50.00% by mass or more to 95.00% or less relative to the total mass of the ink. As the water-soluble organic solvent, alcohols, glycols, (poly)alkylene glycols, nitrogen-containing compounds, sulfur-containing compounds and so on that can be used for inks for ink jet are usable. The content (% by mass) of the water-soluble organic solvent in the ink is preferably 3.00% by mass or more to 50.00% or less relative to the total mass of the ink. If the content of the water-soluble organic solvent is outside the above range, it may slightly lower reliability of the aqueous ink for ink jet such as its anti-sticking property.

<<Other Components>>

Besides the components described above, the ink may contain a water-soluble organic compound that is solid at 25° C. including polyhydric alcohols such as trimethylolpropane and trimethylolethane, urea and a urea derivative such as ethylene urea as appropriate. Further, the ink may contain various additives such as a surfactant, pH adjuster, defoamer, corrosion inhibitor, preservative, mildewproofing agent, antioxidant, reduction inhibitor and chelator as appropriate. In the case of using a surfactant, the content (% by mass) of the surfactant in the ink is preferably 0.10% by mass or more to 5.00% or less and more preferably 0.10% by mass or more to 2.00% or less relative to the total mass of the ink.

The ink may contain another resin in addition to the resin particle described above. As the other resin, a water-soluble resin is preferably used. Examples of the water-soluble resin include an acrylic-based resin, a urethane-based resin, an olefin-based resin and so on. Of these, the acrylic-based resin and the urethane-based resin are preferable.

<<Physical Properties of Ink>>

The ink of the present invention is an aqueous ink to be used for an ink jet type. Thus, from the viewpoint of reliability, it is preferable to appropriately control the values of the ink's physical properties. The viscosity of the ink at 25° C. is preferably 1.0 mPa s or more to 10.0 mPa s or less, more preferably 1.0 mPa s or more to 5.0 mPa s or less, and particularly preferably 1.0 mPa s or more to 3.0 mPa s or less. Also, the surface tension of the ink at 25° C. is preferably 10 mN/m or more to 60 mN/m or less, more preferably 20 mN/m or more to 60 mN/m or less, and particularly preferably 30 mN/m or more to 50 mN/m or less. The pH of the ink at 25° C. is preferably 5.0 or more to 10.0 or less and more preferably 7.0 or more to 9.5 or less.

<Ink Cartridge>

The ink cartridge of the present invention includes an ink and an ink storage portion that stores this ink. Moreover, the ink stored in this ink storage portion is the aqueous ink of the present invention described above. FIG. 1 is a cross-sectional view schematically illustrating one embodiment of the ink cartridge of the present invention. As illustrated in FIG. 1, at the bottom surface of the ink cartridge, there is provided an ink supply port 12 for supplying the ink to a recording head. The inside of the ink cartridge is an ink storage portion for storing the ink. The ink storage portion includes an ink storing chamber 14 and an absorber holding chamber 16, which communicate with each other through a communication port 18. The absorber holding chamber 16 also communicates with the ink supply port 12. The ink storing chamber 14 stores a liquid ink 20, and the absorber holding chamber 16 contains absorbers 22 and 24 that hold the ink in an immersed state. The configuration of the ink storage portion may be such that it has no ink containing chamber for containing the liquid ink and holds the entire amount of the ink to be contained by means of the absorbers. Alternatively, the configuration of the ink storage portion may be such that it has no absorber and stores the entire amount of the ink in the form of liquid. Still alternatively, an ink cartridge with a configuration in which it has an ink storage portion and a recording head may be employed.

<Ink Jet Recording Method>

The ink jet recording method of the present invention is a method of recording an image onto a recording medium by ejecting the aqueous ink of the present invention described above from a recording head of an ink jet type. Examples of the ink ejection method include a method involving applying mechanical energy to the ink and a method involving applying thermal energy to the ink. In the present invention, it is particularly preferable to employ the method involving applying thermal energy to the ink. Besides using the ink of the present invention, the steps in the ink jet recording method may be publicly known steps.

Figure 2A:
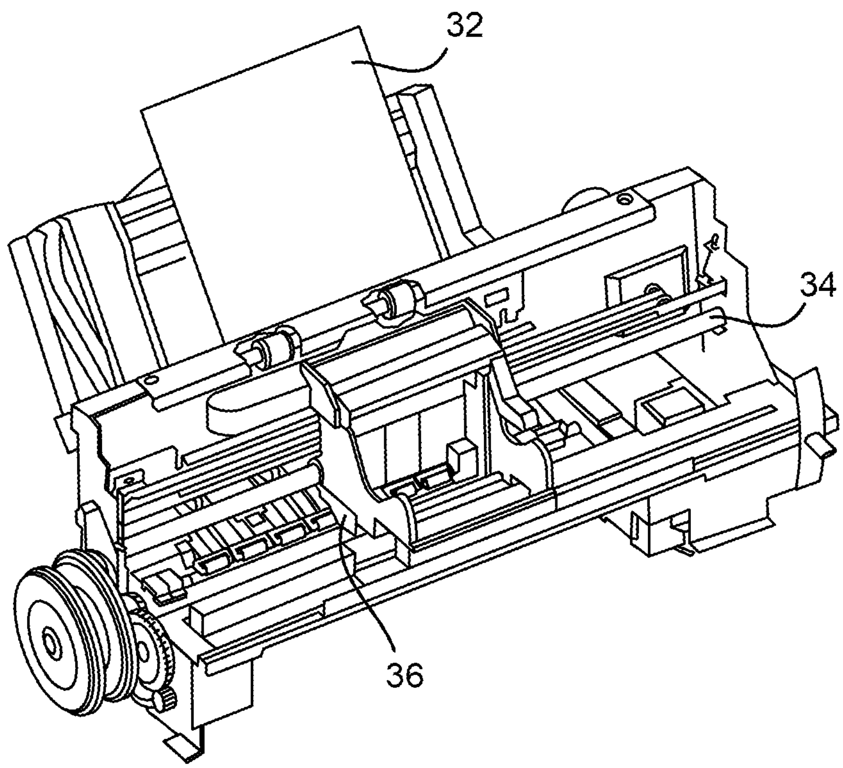
FIGS. 2A and 2B are views schematically illustrating one example of an ink jet recording apparatus for use in an ink jet recording method of the present invention, FIG. 2A being a perspective view of a main part of the ink jet recording apparatus, FIG. 2B being a perspective view of a head cartridge.
Figure 2B:
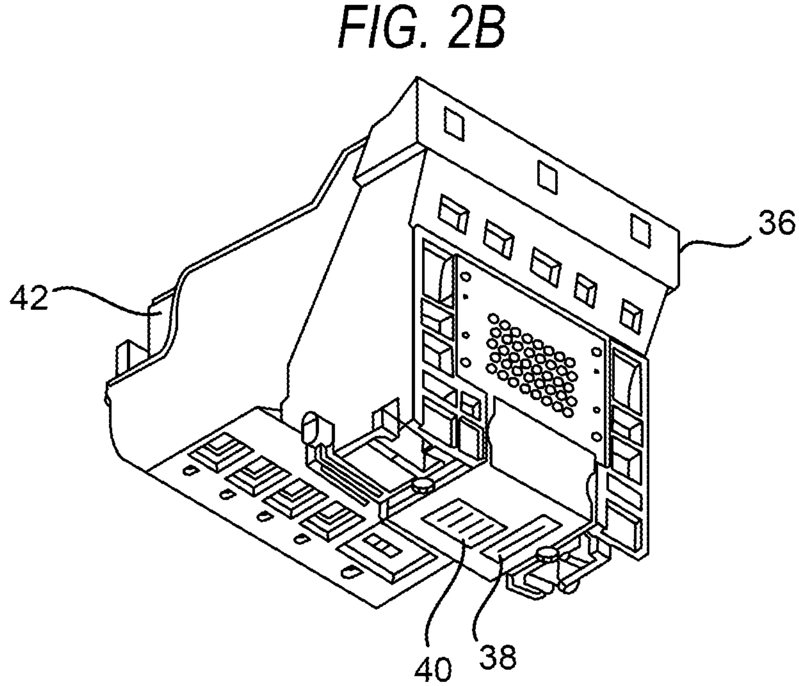

FIGS. 2A and 2B are views schematically illustrating one example of an ink jet recording apparatus for use in the ink jet recording method of the present invention, FIG. 2A being a perspective view of a main part of the ink jet recording apparatus, FIG. 2B being a perspective view of a head cartridge. The ink jet recording apparatus is provided with a conveyance unit (not illustrated) that conveys a recording medium 32 and a carriage shaft 34. A head cartridge 36 can be mounted on the carriage shaft 34. The head cartridge 36 includes recording heads 38 and 40 and is configured such that an ink cartridge 42 can be set thereon. While the head cartridge 36 is conveyed in the main scanning direction along the carriage shaft 34, the ink (not illustrated) is ejected from the recording heads 38 and 40 toward the recording medium 32. Moreover, the recording medium 32 is conveyed in the sub scanning direction by the conveyance unit (not illustrated). As a result, an image is recorded onto the recording medium 32.

EXAMPLES

Hereinafter, the present invention will be described in more detail based on Examples and Comparative Examples. However, the present invention is by no means limited to the following Examples as long as the gist thereof is not exceeded. The amounts of components represented by "part(s)" and "%" are based on mass, unless otherwise noted.

<Method of Measuring Values of Physical Properties>

<<Acid Value of Resin>>

Using 1.0 mol/L of an aqueous solution of hydrochloric acid, resin particles were each caused to deposit, thoroughly washed with water, and then dried at 60° C. The dried product thus obtained was added to and dissolved in 50 mL of tetrahydrofuran at 50° C., followed by adding 5 mL of water and cooling down to room temperature. As a result, a measurement sample was obtained. The obtained measurement sample was subjected to an acid-base titration to measure the acid value of the resin. For the acid-base titration, an automatic potentiometric titrator (trade name "AT510", manufactured by Kyoto Electronics Manufacturing Co., Ltd.) equipped with a combined glass electrode (trade name "C-171", manufactured by Kyoto Electronics Manufacturing Co., Ltd.) was used. As the titration reagent, 0.5 mol/L of a potassium hydroxide ethanol solution was used.

<<Weight Average Molecular Weight of Resin>>

The resin particle was added to tetrahydrofuran, dissolved for 24 hours at 25° C., and then filtered through a membrane filter to prepare a sample. The content of the resin in the sample was adjusted to be approximately 0.3%. The prepared sample was subjected to gel permeation chromatography under the conditions listed below. Then, the weight average molecular weight of the resin was calculated from a molecular weight calibration curve created using standard polystyrene resins. Note that trade names "TSK Standard Polystyrene" F-850, F-450, F-288, F-128, F-80, F-40, F-20, F-10, F-4, F-2, F-1, A-5000, A-2500, A-1000 and A-500, manufactured by Tosoh Corporation) were used as the standard polystyrene resins.

High-performance liquid chromatography (HPLC) apparatus: trade name "2695 Separations Module" (manufactured by Waters Corporation)

Differential refractive index (RI) detector: trade name "2414 detector" (manufactured by Waters Corporation)

Column: four columns of trade name "GPC KF-806M" (manufactured by Showa Denko K.K.)

Eluent: tetrahydrofuran

Flow rate: 1.0 mL/min

Oven temperature: 40° C.

Amount of sample injected: 100 μL

<<Determination of Whether Sample is Particle, and Particle Size>>

The liquid containing the sample was diluted with pure water to obtain a measurement sample in which the content of the sample was adjusted to approximately 1.0%. Then, the particle size ($D_{50}$) of the particle in the measurement sample was measured using a particle size measurement apparatus. The conditions for this measurement are listed below. As the particle size measurement apparatus, a particle size distribution analyzer using dynamic light scattering (trade name "Nanotrac WAVE II-Q", manufactured by MicrotracBEL Corp.) was used. When a particle having a particle size was observed by the above method, that sample was determined as "particle" (determined as "aqueous dispersion liquid"). When a particle having a particle size was not observed, that sample was determined as not "particle" (determined as "aqueous solution"). A cumulative 50% particle size $D_R$ (nm) of the resin particle in a volume-based particle size distribution and a cumulative 50% particle size $D_P$ (nm) of the pigment in a volume-based particle size distribution were measured by similar methods.

[Measurement Conditions]

SetZero: 30 seconds

Number of times measurement was performed: 10

Measurement duration: 120 seconds

Shape: perfect sphere

Refractive index: 1.5

Density: 1.0

<Synthesis of Resin>

<<Acrylic Resin>>

A reaction vessel equipped with a stirrer, a nitrogen gas introduction pipe, a capacitor and a thermometer was prepared. 100 parts of monomers (66 parts of styrene, 18 parts of n-butyl acrylate and 16 parts of acrylic acid) and 100 parts of toluene were charged into this reaction vessel. Moreover, 3 parts of benzoyl peroxide was added, and the mixture was reacted for 2 hours at 100° C. under a nitrogen gas atmosphere. The solvent was distilled away at 140° C. and 26 Pa, and the temperature and the pressure were set back to 25° C. and atmospheric pressure, respectively. The resultant product was crushed with a crusher. As a result, an acrylic resin 1 was obtained. The acid value of the obtained acrylic resin was 120 mgKOH/g, and its weight average molecular weight was 10,000.

<<Polyester Resin>>

A reaction vessel equipped with a stirrer, a capacitor and a thermometer was prepared. A mixture of 80 parts of ethylene glycol, 10 parts of bisphenol A, 50 parts of terephthalic acid, 50 parts of isophthalic acid and 10 parts of trimellitic acid and tetra-n-butyl titanate were charged into this reaction vessel, and heated to 240° C. over 4 hours to undergo an esterification reaction. The amount of the tetra-n-butyl titanate was 200 ppm relative to the amount of the above mixture. The pressure was lowered to 26 Pa over 20 minutes, and the state of being depressurized to 26 Pa at 240° C. was maintained for 90 minutes. The temperature and pressure were set back to 25° C. and atmospheric pressure, respectively, and then the resultant product was crushed with a crusher. As a result, a polyester resin was obtained. The acid value of the obtained polyester resin was 30 mgKOH/g, and its weight average molecular weight was 10,000.

<<Urethane Resin>>

A reaction vessel equipped with a stirrer, a thermometer, a nitrogen gas introduction pipe and a reflux pipe was prepared. 35 parts of isophorone diisocyanate and 50 parts of polyethylene glycol having number average molecular weight of 1,000 were charged into this reaction vessel and reacted with each other for 2 hours at 100° C. under a nitrogen gas atmosphere. 14 parts of dimethylol propionic acid, 1 part of ethylenediamine and 100 parts of methyl ethyl ketone were added. Then, while the residual ratio of the isocyanate groups was checked by FT-IR, the reaction was continued at 78° C. until a desired residual ratio was reached. As a result, a reaction liquid was obtained. The obtained reaction liquid was cooled down to 40° C., and then the methyl ethyl ketone was distilled away under reduced pressure to obtain a paste. The obtained paste was dissolved by adding tetrahydrofuran. As a result, a liquid containing a urethane resin was obtained. The acid value of the obtained urethane resin was 30 mgKOH/g, and its weight average molecular weight was 10,000.

<<Polystyrene Resin>>

A polystyrene resin was obtained in a similar manner to the above acrylic resin except that 45 parts of styrene, 50 parts of sodium p-styrenesulfonate and 5 parts of divinylbenzene were used as 100 parts of monomers. The acid value of the obtained polystyrene resin was 120 mgKOH/g, and its weight average molecular weight was 10,000.

<Manufacture of Resin Particles>

A 2 L beaker with a stirrer (trade name "Tornado Stirrer Standard SM-104", manufactured AS ONE Corporation) set therein was prepared. Each kind of resin listed in Table 1 was dissolved in tetrahydrofuran heated to 45° C. and was adjusted to a desired density. 300 parts of this resin solution was put in a beaker. A 5% potassium hydroxide aqueous solution containing potassium hydroxide in an amount to be used corresponding to the neutralization ratio (mol %) listed in Table 1, which was based on the acid value of the resin, was added. The mixture was stirred for 30 minutes to neutralize the acid group of the resin. Note that the polystyrene resin was not neutralized. Then, to adjust the particle size, 300 parts of deionized water was dripped at a rate of 20 mL/min while the mixture was stirred at a predetermined number of revolutions at 45° C. The organic solvent and part of the water were distilled away by depressurization. Then, the content in the beaker was filtered using a 150-mesh metallic screen (a filter with 150 stainless steel wires woven vertically and horizontally within each 1-inch square). Then, the kind of crosslinking agent listed in Table 1 was added to allow a crosslinking reaction at 80° C. for 6 hours. After cooling down the mixture to room temperature, an appropriate amount of deionized water was added to adjust the content of the resin particle. As a result, a liquid containing the resin particle was obtained in which the content of the resin particle was 20.0%. Table 1 shows $D_R$(nm), or the cumulative 50% particle size ($D_{50}$), of the resin particle in a volume-based particle size distribution in the obtained liquid containing the resin particle, and the presence or absence of a crosslinking structure. Components in Table 1 mean as follows.

EX-810: ethylene glycol diglycidyl ether (trade name "DENACOL EX-810", manufactured by Nagase ChemteX Corporation)

WS-300: oxazoline group-containing polymer (trade name "EPOCROS WS-300", manufactured by NIPPON SHOKUBAI CO., LTD.)

EX-830: polyethylene glycol diglycidyl ether (trade name "DENACOL EX-830", manufactured by Nagase ChemteX Corporation)

EX-841: polyethylene glycol diglycidyl ether (trade name "DENACOL EX-841", manufactured by Nagase ChemteX Corporation)

TABLE 1

Conditions for Manufacturing Resin Particles, and Their Properties

| | Manufacturing Conditions | | | Properties | |
|---|---|---|---|---|---|
| Resin Particle | Resin | Neutralization Ratio (Mol %) | Crosslinking Agent | Particle Size of Resin Particle $D_R$ (nm) | Crosslinking Structure |
| 1 | Acrylic Resin | 80 | EX-810 | 8 | Present |
| 2 | Acrylic Resin | 75 | EX-810 | 10 | Present |
| 3 | Polyester Resin | 95 | EX-810 | 7 | Present |
| 4 | Urethane Resin | 95 | EX-810 | 6 | Present |
| 5 | Polystyrene Resin | 0 | EX-810 | 8 | Present |
| 6 | Acrylic Resin | 80 | WS-300 | 8 | Present |
| 7 | Acrylic Resin | 80 | EX-830 | 8 | Present |
| 8 | Acrylic Resin | 80 | EX-841 | 8 | Present |
| 9 | Polystyrene Resin | 0 | WS-300 | 8 | Present |
| 10 | Acrylic Resin | 80 | — | 8 | Absent |
| 11 | Acrylic Resin | 70 | EX-810 | 12 | Present |

<Preparation of Pigments>

The pigments listed below were prepared, from which finer pigments were produced by solvent salt milling. Specifically, in the presence of sodium chloride as a grinding agent and diethylene glycol, each of the prepared pigments was subjected to a grinding process with a kneader for a predetermined period of time under a predetermined temperature condition to obtain a kneaded product of a finer pigment. The kneaded product thus obtained was thoroughly washed and then filtered and dried. As a result, a finer pigment was obtained. Also, commercially available carbon black and the titanium oxide were used as they were.

C.I. Pigment Red 122
C.I. Pigment Yellow 74
C.I. Pigment Blue 15:3
C.I. Pigment Green 36
C.I. Pigment Red 149
C.I. Pigment Violet 23
C.I. Pigment Red 254

<Manufacture of Pigment Dispersion Liquids>

<<Pigment Dispersion Liquids 1 to 23 and 25 to 28>>

Mixtures each containing one of the pigments of the types and amounts listed in Table 2, the liquid containing one of the resin particles and pure water were each charged in a batch type vertical sand mill filled with 200 parts of 0.3 mm diameter zirconia beads (manufactured by IMEX Co., Ltd.) and subjected to a dispersion process for a predetermined period of time. After removing coarse particles by centrifugation, the mixture was filtered through a microfilter with a pore size of 3.0 μm (manufactured by FUJIFILM Corporation) under pressure. As a result, a pigment dispersion liquid was obtained.

<<Pigment Dispersion Liquid 24>>

A pigment dispersion liquid 24 was obtained in a similar manner to the pigment dispersion liquids 1 to 23 and 25 to 28 except that an aqueous solution containing a water-soluble resin with a content of 16.0% obtained by dissolving the resin in an aqueous solution containing potassium hydroxide equimolar to the acid value of the resin was used instead of the liquid containing one of the resin particles. As the water-soluble resin, a styrene-ethyl acrylate-acrylic acid copolymer having an acid value of 125 mgKOH/g and a weight average molecular weight of 10,000 was used.

Table 2 shows properties of each of the obtained pigment dispersion liquids.

TABLE 2

Conditions for Manufacturing Pigment Dispersion Liquids, and Their Properties

| | Manufacturing Conditions | | | | | | | | Properties | | |
|---|---|---|---|---|---|---|---|---|---|---|---|
| | Liquid Containing Resin Particle | | | Pigment | | | | | Content | | |
| Pigment Dispersion Liquid | Type | Particle Size $D_R$ (nm) | Amount (g) | Type | Particle Size $D_P$ (nm) | Amount (g) | Pure Water Amount (g) | DP/DR (times) | Pigment $C_P$ (%) | Resin Particle $C_R$ (%) | $C_R$/C (times) |
| 1 | 1 | 8 | 8.00 | CT. Pigment Red 122 | 48 | 10.00 | 82.00 | 6.0 | 10.0 | 1.6 | 0.16 |
| 2 | 1 | 8 | 10.00 | C.I. Pigment Yellow 74 | 40 | 10.00 | 80.00 | 5.0 | 10.0 | 2.0 | 0.20 |
| 3 | 1 | 8 | 10.50 | CT. Pigment Blue 15:3 | 32 | 10.00 | 79.50 | 4.0 | 10.0 | 2.1 | 0.21 |
| 4 | 1 | 8 | 5.40 | CT. Pigment Green 36 | 56 | 10.00 | 84.60 | 7.0 | 10.0 | 1.1 | 0.11 |
| 5 | 1 | 8 | 5.40 | CT. Pigment Red 149 | 36 | 10.00 | 84.60 | 4.5 | 10.0 | 1.1 | 0.11 |
| 6 | 1 | 8 | 5.40 | C.I. Pigment Violet 23 | 44 | 10.00 | 84.60 | 5.5 | 10.0 | 1.1 | 0.11 |
| 7 | 1 | 8 | 5.40 | C.I. Pigment Red 254 | 52 | 10.00 | 84.60 | 6.5 | 10.0 | 1.1 | 0.11 |
| 8 | 1 | 8 | 12.50 | Carbon Black | 47 | 10.00 | 77.50 | 5.9 | 10.0 | 2.5 | 0.25 |
| 9 | 1 | 8 | 15.00 | Titanium Oxide | 30 | 10.00 | 75.00 | 3.8 | 10.0 | 3.0 | 0.30 |
| 10 | 2 | 10 | 9.50 | C.I. Pigment Red 122 | 48 | 10.00 | 80.50 | 4.8 | 10.0 | 1.9 | 0.19 |
| 11 | 1 | 8 | 8.00 | C.I. Pigment Red 122 | 24 | 10.00 | 82.00 | 3.0 | 10.0 | 1.6 | 0.16 |
| 12 | 1 | 8 | 8.00 | C.I. Pigment Red 122 | 64 | 10.00 | 82.00 | 8.0 | 10.0 | 1.6 | 0.16 |
| 13 | 1 | 8 | 2.50 | C.I. Pigment Red 122 | 48 | 10.00 | 87.50 | 6.0 | 10.0 | 0.5 | 0.05 |
| 14 | 1 | 8 | 3.00 | C.I. Pigment Red 122 | 48 | 10.00 | 87.00 | 6.0 | 10.0 | 0.6 | 0.06 |
| 15 | 1 | 8 | 50.00 | C.I. Pigment Red 122 | 48 | 10.00 | 40.00 | 6.0 | 10.0 | 10.0 | 1.00 |
| 16 | 1 | 8 | 55.00 | C.I. Pigment Red 122 | 48 | 10.00 | 35.00 | 6.0 | 10.0 | 11.0 | 1.10 |
| 17 | 3 | 7 | 8.00 | C.I. Pigment Red 122 | 48 | 10.00 | 82.00 | 6.9 | 10.0 | 1.6 | 0.16 |
| 18 | 4 | 6 | 8.00 | C.I. Pigment Red 122 | 48 | 10.00 | 82.00 | 8.0 | 10.0 | 1.6 | 0.16 |
| 19 | 5 | 8 | 8.00 | C.I. Pigment Red 122 | 48 | 10.00 | 82.00 | 6.0 | 10.0 | 1.6 | 0.16 |
| 20 | 6 | 8 | 8.00 | C.I. Pigment Red 122 | 48 | 10.00 | 82.00 | 6.0 | 10.0 | 1.6 | 0.16 |
| 21 | 7 | 8 | 8.00 | C.I. Pigment Red 122 | 48 | 10.00 | 82.00 | 6.0 | 10.0 | 1.6 | 0.16 |
| 22 | 8 | 8 | 8.00 | C.I. Pigment Red 122 | 48 | 10.00 | 82.00 | 6.0 | 10.0 | 1.6 | 0.16 |
| 23 | 9 | 8 | 2.50 | C.I. Pigment Red 122 | 48 | 10.00 | 87.50 | 6.0 | 10.0 | 0.5 | 0.05 |

TABLE 2-continued

Conditions for Manufacturing Pigment Dispersion Liquids, and Their Properties

| | Manufacturing Conditions | | | | | | | | Properties | | |
|---|---|---|---|---|---|---|---|---|---|---|---|
| | Liquid Containing Resin Particle | | | Pigment | | | Pure | | Content | | |
| Pigment Dispersion Liquid | Type | Particle Size $D_R$ (nm) | Amount (g) | Type | Particle Size $D_p$ (nm) | Amount (g) | Water Amount (g) | DP/DR (times) | Pigment $C_P$ (%) | Resin Particle $C_R$ (%) | $C_R$/C (times) |
| 24 | — | — | 0.00 | C.I. Pigment Red 122 | 48 | 10.00 | 90.00 | — | 10.0 | 0.0 | 0.00 |
| 25 | 10 | 8 | 8.00 | C.I. Pigment Red 122 | 48 | 10.00 | 82.00 | 6.0 | 10.0 | 1.6 | 0.16 |
| 26 | 11 | 12 | 9.50 | C.I. Pigment Red 122 | 48 | 10.00 | 80.50 | 4.0 | 10.0 | 1.9 | 0.19 |
| 27 | 1 | 8 | 8.00 | C.I. Pigment Red 122 | 20 | 10.00 | 82.00 | 2.5 | 10.0 | 1.6 | 0.16 |
| 28 | 1 | 8 | 8.00 | C.I. Pigment Red 122 | 70 | 10.00 | 82.00 | 8.8 | 10.0 | 1.6 | 0.16 |

<Preparation of Inks>

Examples 1 to 23 and Comparative Examples 1, 2 and 4 to 6

Inks were each prepared by mixing the components listed below, sufficiently stirring the mixture and then filtering it under pressure through a microfilter with a pore size of 2.5 μm. Of the components listed below, "ACETYLENOL E100" is the trade name of a nonionic surfactant (manufactured by Kawaken Fine Chemicals Co., Ltd.). Table 3 shows properties of the inks.

Pigment dispersion liquid listed in Table 3: 30.00%
Glycerin: 10.00%
Triethylene glycol: 10.00%
ACETYLENOL E100: 0.10%
Ion-exchanged water: 49.00%

TABLE 3

Compositions and Properties of Inks

| | | Pigment Dispersion Liquid | Content of Pigment CP (%) | Content of Resin Particle CR (%) | CR/CP (times) |
|---|---|---|---|---|---|
| Example | 1 | 1 | 3.00 | 0.48 | 0.16 |
| | 2 | 2 | 3.00 | 0.60 | 0.20 |
| | 3 | 3 | 3.00 | 0.63 | 0.21 |
| | 4 | 4 | 3.00 | 0.32 | 0.11 |
| | 5 | 5 | 3.00 | 0.32 | 0.11 |
| | 6 | 6 | 3.00 | 0.32 | 0.11 |
| | 7 | 7 | 3.00 | 0.32 | 0.11 |
| | 8 | 8 | 3.00 | 0.75 | 0.25 |
| | 9 | 9 | 3.00 | 0.90 | 0.30 |
| | 10 | 10 | 3.00 | 0.57 | 0.19 |
| | 11 | 11 | 3.00 | 0.48 | 0.16 |
| | 12 | 12 | 3.00 | 0.48 | 0.16 |
| | 13 | 13 | 3.00 | 0.15 | 0.05 |
| | 14 | 14 | 3.00 | 0.18 | 0.06 |
| | 15 | 15 | 3.00 | 3.00 | 1.00 |
| | 16 | 16 | 3.00 | 3.30 | 1.10 |
| | 17 | 17 | 3.00 | 0.48 | 0.16 |
| | 18 | 18 | 3.00 | 0.48 | 0.16 |
| | 19 | 19 | 3.00 | 0.48 | 0.16 |
| | 20 | 20 | 3.00 | 0.48 | 0.16 |

TABLE 3-continued

Compositions and Properties of Inks

| | | Pigment Dispersion Liquid | Content of Pigment CP (%) | Content of Resin Particle CR (%) | CR/CP (times) |
|---|---|---|---|---|---|
| | 21 | 21 | 3.00 | 0.48 | 0.16 |
| | 22 | 22 | 3.00 | 0.48 | 0.16 |
| | 23 | 23 | 3.00 | 0.15 | 0.05 |
| Comparative Example | 1 | 24 | 3.00 | 0.00 | 0.00 |
| | 2 | 25 | 3.00 | 0.48 | 0.16 |
| | 3 | 24 | 3.00 | 0.48 | 0.16 |
| | 4 | 26 | 3.00 | 0.57 | 0.19 |
| | 5 | 27 | 3.00 | 0.48 | 0.16 |
| | 6 | 28 | 3.00 | 0.48 | 0.16 |

Comparative Example 3

An ink was prepared by mixing the components listed below, sufficiently stirring the mixture and then filtering it under pressure through a microfilter with a pore size of 2.5 μm. Of the components listed below, "ACETYLENOL E100" is the trade name of a nonionic surfactant (manufactured by Kawaken Fine Chemicals Co., Ltd.).

Pigment dispersion liquid 24: 30.00%
Glycerin: 10.00%
Triethylene glycol: 10.00%
ACETYLENOL E100: 0.10%
Liquid containing the resin particle 1: 2.40%
Ion-exchanged water: 46.60%

<Evaluation>

In the present invention, the evaluation criteria of each following item are such that "A" and "B" are acceptable levels and "C" is an unacceptable level. Table 4 shows the evaluation results.

<<Image Clarity>>

Each of the prepared inks was filled in an ink cartridge, which was then mounted in an ink jet recording apparatus that ejects an ink from a recording head by applying thermal energy (trade name "PIXUS iP3100", manufactured by Canon Inc.). In Examples, the recording duty of a solid image recorded under the condition of applying a single 5 μL ink droplet to a 1/1,200 inch×1/1,200 inch unit region is defined as 100%. Using this ink jet recording apparatus, a 2 cm×2 cm solid image with a recording duty of 100% was recorded on a recording medium (trade name "Canon Photo Paper Glossy Gold GL-101", manufactured by Canon Inc.). The recorded image was dried at 25° C. for 24 hours. After that, using two fluorescent lamps placed side by side with a 10 cm gap therebetween, the image was irradiated with light at a 45 degree angle from a 2 m distance (lighting angle: 45 degrees). The shapes of the fluorescent lamps projected on the image were visually checked at a 45 degree angle (observation angle: 45 degrees), and the image clarity of the image was evaluated based on the following evaluation criteria.

A: The boundary between the two projected fluorescent lights was discernible, and no blurring was observed on the edges.

B: The boundary between the two projected fluorescent lights was discernible, but blurring was observed on the edges.

C: The boundary between the two projected fluorescent lights was not discernible.

<<Deviation of Ejection>>

Using the above ink jet recording apparatus, preliminary ejection was performed so that the ink would be normally ejected from each ejection orifice of the recording head. After the preliminary ejection, no ejection was performed for 2 seconds, and then a ruler line with a width of three dots of ink droplets was recorded. The recorded ruler line was visually checked, and the deviation of ejection of the ink was evaluated based on the following evaluation criteria.

A: A continuous ruler line was recorded with no deviation in the positions to which the dots forming the ruler line were applied.

B: A continuous ruler line was recorded with a deviation of about a single dot in the positions to which dots forming the ruler line were applied.

C: The ruler line had portions where misfiring occurred and the line was discontinuous.

<<Storage Stability>>

The viscosity of each of the prepared inks was measured (pre-storage viscosity). Then, the ink was placed in a well-closed container and preserved in a thermostatic bath at 70° C. for 2 weeks. The temperature of the ink was returned to 25° C., and its viscosity was measured (post-storage viscosity). The viscosity was measured using an E-type viscometer (manufactured by Toki Sangyo Co., Ltd, RE-80L type). The ratio of post-storage viscosity/pre-storage viscosity was calculated, and the storage stability of the ink was evaluated based on the following evaluation criteria.

A: "Post-storage viscosity/pre-storage viscosity" was 1.2 times or less.

B: "Post-storage viscosity/pre-storage viscosity" was more than 1.2 times to 1.3 times or less.

C: "Post-storage viscosity/pre-storage viscosity" was more than 1.3 times.

TABLE 4

| | | Evaluation Results | | |
|---|---|---|---|---|
| | | Image Clarity | Deviation of Ejection | Storage Stability |
| Example | 1 | A | A | A |
| | 2 | A | A | A |
| | 3 | A | A | A |
| | 4 | A | A | A |
| | 5 | A | A | A |
| | 6 | A | A | A |
| | 7 | A | A | A |
| | 8 | A | A | A |
| | 9 | A | A | A |
| | 10 | A | A | A |
| | 11 | A | A | A |
| | 12 | A | A | A |
| | 13 | A | A | B |
| | 14 | A | A | A |
| | 15 | A | A | A |
| | 16 | A | B | A |
| | 17 | A | B | A |
| | 18 | A | B | A |
| | 19 | A | B | B |
| | 20 | A | A | B |
| | 21 | A | A | A |
| | 22 | A | B | A |
| | 23 | B | B | B |
| Comparative Example | 1 | B | C | C |
| | 2 | A | C | A |
| | 3 | A | C | C |
| | 4 | A | A | C |
| | 5 | A | A | C |
| | 6 | C | A | A |

According to the present invention, it is to provide an aqueous ink for ink jet with which an image with excellent image clarity can be recorded and also which suppresses deviation of ejection and has excellent storage stability. Also, according to the present invention, it is to provide an ink cartridge and an ink jet recording method using this aqueous ink.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-201440, filed Dec. 13, 2021, and Japanese Patent Application No. 2022-178322, filed Nov. 7, 2022 which are hereby incorporated by reference herein in their entirety.

What is claimed is:

1. An aqueous ink for ink jet comprising a pigment and a resin particle that disperses the pigment, wherein the resin particle is adsorbed to the pigment, a cumulative 50% particle size of the resin particle in a volume-based particle size distribution is less than 10 nm, the resin particle has a crosslinking structure, and a ratio of a cumulative 50% particle size of the pigment in a volume-based particle size distribution to the cumulative 50% particle size of the resin particle in a volume-based particle size distribution is 3.0 times or more to 8.0 times or less.

2. The aqueous ink according to claim 1, wherein a mass ratio of a content (% by mass) of the resin particle to a content (% by mass) of the pigment is 0.06 times or more to 1.00 times or less.

3. The aqueous ink according to claim 1, wherein the resin particle is formed of at least one kind of resin having a carboxylic acid group selected from the group consisting of an acrylic-based resin, a polyester-based resin and a urethane-based resin.

4. The aqueous ink according to claim 1, wherein the resin particle is formed of an acrylic-based resin.

5. The aqueous ink according to claim 1, wherein the cumulative 50% particle size of the resin particle in a volume-based particle size distribution is 8 nm or less.

6. The aqueous ink according to claim 1, wherein the crosslinking structure includes an alkylene oxide group.

7. The aqueous ink according to claim 6, wherein the repetition number of the alkylene oxide group in the crosslinking structure is nine or less.

8. An ink cartridge comprising an ink and an ink storage portion for storing the ink, wherein the ink comprises the aqueous ink according to claim 1.

9. An ink jet recording method for recording an image onto a recording medium by ejecting an ink from a recording head of an ink jet type, wherein the ink comprises the aqueous ink according to claim 1.

* * * * *